Oct. 18, 1960

W. L. BATTEN ET AL 2,956,304

APPARATUS FOR ATOMIZING MOLTEN METAL

Filed Dec. 6, 1956

DEWATER

INVENTORS:
WILLIAM L. BATTEN
GEORGE A. ROBERTS

BY

ATT'YS

Oct. 18, 1960 W. L. BATTEN ET AL 2,956,304
APPARATUS FOR ATOMIZING MOLTEN METAL
Filed Dec. 6, 1956 4 Sheets-Sheet 2

INVENTORS:
WILLIAM L. BATTEN
GEORGE A. ROBERTS
BY Marshall, Johnston,
Cook & Grue
ATT'YS

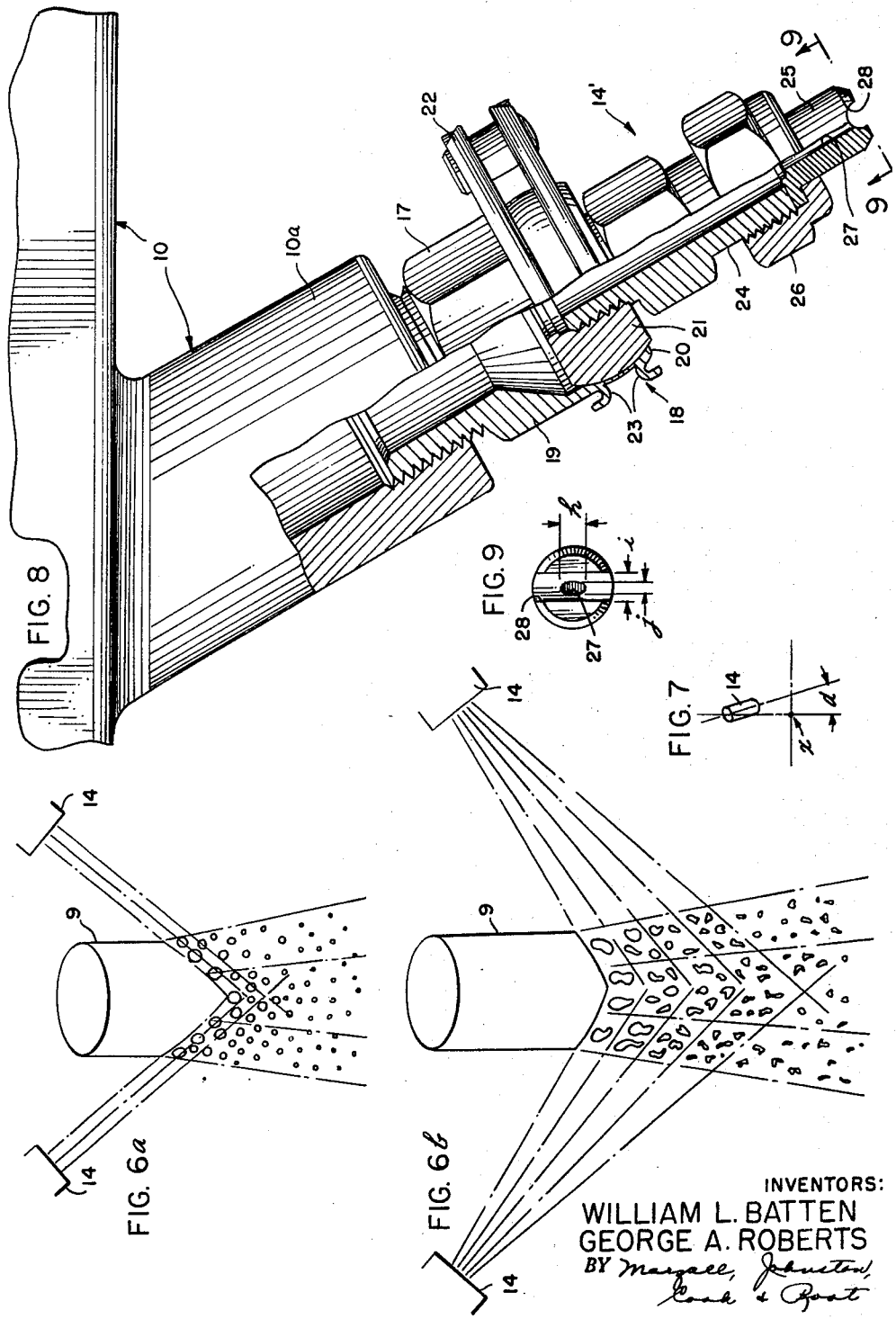

Oct. 18, 1960 W. L. BATTEN ET AL 2,956,304
APPARATUS FOR ATOMIZING MOLTEN METAL
Filed Dec. 6, 1956 4 Sheets-Sheet 4

INVENTORS:
WILLIAM L. BATTEN
GEORGE A. ROBERTS
BY
ATT'YS

United States Patent Office 2,956,304
Patented Oct. 18, 1960

2,956,304

APPARATUS FOR ATOMIZING MOLTEN METAL

William L. Batten and George A. Roberts, Latrobe, Pa., assignors to Vanadium-Alloys Steel Company, Latrobe, Pa., a corporation of Pennsylvania Filed Dec. 6, 1956, Ser. No. 626,657

5 Claims. (Cl. 18—2.5)

This invention relates to a new and improved apparatus for atomizing molten metal to produce comminuted metal particles having a desired shape and size. The comminuted particles are useful in powder metallurgical applications, such as in the fabrication of sintered or molded articles, and in other applications for fine metal particles or powders.

Prior to the invention, several types of apparatus have been proposed for atomizing molten metals. However, they have suffered from several disadvantages, such as inability to produce a desired or preferred particle shape and the desired particle size or particle size distribution. In some applications of comminuted metal, irregular particles are preferred, whereas in others, round or spherical particles are preferred. Likewise, different applications require different particle sizes. It is especially desirable to produce a high proportion of particles which pass through a 100-mesh sieve (U.S. sieve series).

It is an object of the invention to provide a new and improved apparatus for atomizing molten metal which overcomes the prior disadvantages and, in particular, produce comminuted particles having a desired shape and size.

Another object is to provide an apparatus for producing comminuted metal which is very efficient and enables control of particle size and shape to a very striking degree.

A further object is to provide an apparatus for continuous and progressive deflection of molten metal being atomized within a narrow volume of space and within a short period of time.

An additional object is to provide an apparatus for comminuting molten metal resulting in very little surface oxidation, the metal being contained in a liquid instead of air as the atomization takes place.

A further object is to provide an apparatus for comminuting a large variety of molten metals, including iron and its alloys, nickel and its alloys, cobalt and its alloys, and non-ferrous metals and alloys.

Another object is to provide an apparatus for adjustable concentrated and continuous deflection of a molten metal stream by a plurality of intersecting liquid sprays therearound.

A particular object is to provide an apparatus comprising spray nozzles arranged to provide compound spray angles for selectively controlling the characteristics of atomization and of the comminuted particles produced.

An additional object is to provide an apparatus which successfully modify the tendency of the metal being atomized to assume a preferred particle shape.

These and other objects of the invention will be apparent upon reference to the specification and to the attached drawings, in which like parts are identified by like reference characters in each of the views, and in which Figure 1 is a schematic elevational and sectional view of a preferred apparatus according to the invention, which also illustrates the new method;

Figures 6a and 6b are schematic elevational representations of atomization as it takes place in the invention;

Figure 7 is a schematic illustration of the angle of divergence of a nozzle from the axis of the molten metal stream;

Figure 8 is a side elevational and partly sectional detail view of a preferred nozzle and its mounting;

Figure 9 is an end elevational view of the nozzle head of Figure 8;

Figure 1:
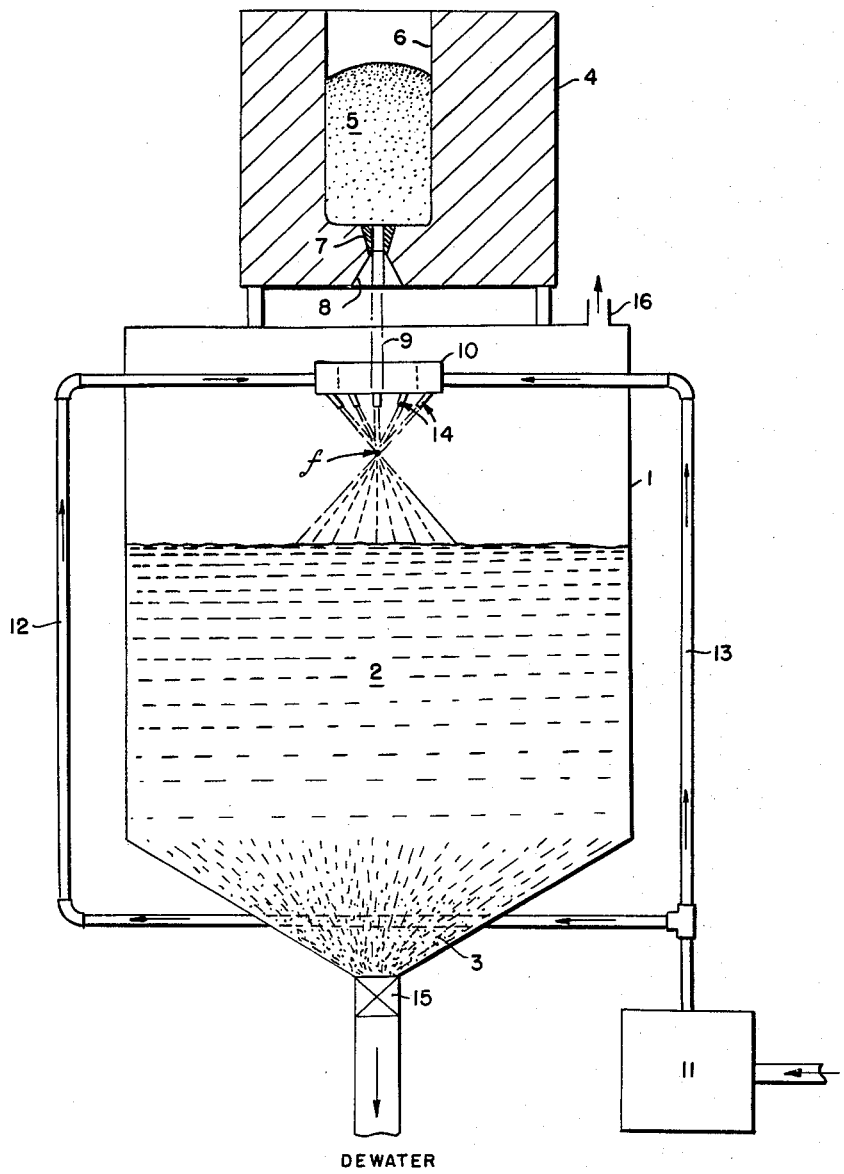

It has been discovered according to the invention that metals being atomized tend to assume a preferred particle shape, and that this tendency can be successfully modified and particle size can simultaneously be controlled as desired to a great degree, by contacting a stream of molten metal with a plurality of liquid sprays and adjusting the sprays relative to the molten metal stream. A plurality of liquid streams are directed from points around the metal stream to intersect the metal stream and each other, disintegrating the metal stream. The metal stream is contained in an area of concentrated, focused liquid power provided by a number of liquid spray streams.

Preferably, molten metal is poured in a small stream, and at least three liquid streams are directed to intersect the metal stream from points surrounding it. The directions of the liquid streams with respect to the metal stream are adjusted and, preferably, unsymmetrical liquid streams are adjusted by rotation about their longitudinal axes, to produce comminuted metal particles having a desired shape and size. It is preferred to employ as the unsymmetrical liquid streams, flat spray streams, which give a wide range of control over the shape and size of the comminuted particles.

The new apparatus according to the invention, especially useful for carrying out the foregoing method or process, includes means forming a stream of molten metal, a plurality of liquid nozzles surrounding the stream for intersection of the liquid streams therefrom with the metal stream and with each other, and means for adjusting the directions of the nozzles with respect to the metal stream. Preferably, at least three nozzles surround the metal stream, and means are also provided for rotatably adjusting the nozzles about their longitudinal axes. The nozzles are preferably adapted to form flat liquid spray streams.

Referring to the drawings, which illustrate preferred embodiments of the invention, the apparatus shown includes a tank or receiver 1 containing a body of water 2 or other suitable liquid, which is provided for receiving and finally cooling comminuted metal particles 3.

A pouring furnace or ladle 4 is suitably mounted above the receiver 1, and a body of molten metal 5 is contained in the chamber or space 6 therein. The base of the pouring furnace is provided with a ceramic pouring nozzle 7, which communicates with the furnace chamber 6 and with a lower conically diverging outlet 8 from the base. The pouring nozzle 7 is preferably provided with a cylindrical opening therethrough, and the diameter of the opening is set according to the composition of the metal, the desired pouring rate, and the characteristics desired for the comminuted metal product. The diameter is established initially for each metal composition by trying nozzles of several diameters to determine that most suitable for producing a comminuted product having the characteristics desired. The nozzles preferably have a diameter of less than about one-half inch. The furnace is thus constructed to pour a small cylindrical stream or jet 9 of molten metal in a vertical column down the axis of the receiver 1.

The cross-section of the pouring nozzle 7 may be other than circular, although this is preferred for best control. This condition and the other metal pouring conditions, e.g., the pour rate, the metal stream thickness or diameter, and the temperature of the molten metal, are initially adjusted or determined empirically, after which control of the comminuted metal particle shape and size is achieved by adjustment of the liquid spray nozzles, as subsequently described. The metal pouring conditions also may include the condition of metal composition, which may be varied at times to facilitate development of desired properties in the metal powders. Contributing conditions also include the liquid spray stream conditions, e.g., the linear and volumetric flow rates, and the liquid composition and temperature.

The molten metal temperature is preferably 100–300° F. above the melting point of metals and alloys having higher melting points. The superheat may be as high as 800° F. or more for lower melting point metals and alloys.

An annular manifold 10 is centrally disposed near the top of the receiver 1 and above the upper surface or level of the body of liquid 2, and it surrounds the molten metal stream 9 passing axially therethrough. Water or other suitable liquid from a reservoir or other source is delivered by means of a pump 11 to the manifold 10, through conduits 12 and 13 which are connected to the interior of the manifold at opposite sides. An annular manifold is preferred to minimize frictional losses, but other shapes can be used.

The water conveyed to the manifold is discharged through a plurality of liquid spray nozzles 14, which are adjustably mounted on the manifold for varying their vertical and horizontal positions and for rotating them, or the nozzle heads, about their longitudinal axes. In Figures 1–5, the manifold 10 and the nozzles 14 are illustrated schematically. They preferably have a construction such as detailed in Figures 8–11, subsequently described, where the manifold includes nozzle mounts 10a.

The nozzles are arranged equiangularly about the vertical axis $x$ of the manifold 10 and equidistantly therefrom, and they are adjusted to extend outwardly from the manifold and inwardly thereof, towards its axis, to intersect the metal stream 9 and each other. The foregoing arrangement of the nozzles is preferred, but variations are permissible.

In a preferred form of the invention, the axes of the nozzles and of the liquid streams therefrom intersect the axis of the metal stream 9 at a single focal point $f$. The axis of the metal stream coincides with the manifold axis and is likewise identified by the letter $x$. The action of the water spray streams or jets on the molten metal shears or cuts the metal stream and produces comminuted metal particles or powder which descend into the body of the water 2 in the receiver, collect at the base thereof, and are removed through a valve 15 at the base.

The foregoing apparatus provide a large number of contact points of metal and water in one area, and results in shearing streams of molten metal particles from the original metal stream, not into the air or other atmosphere, or into a body of water, but into other water streams where the process is repeated. As schematically illustrated in Figure 6a, which has particular reference to the embodiment of Figures 2 and 3, and in Figure 6b, corresponding to Figures 4 and 5, the water sprays may be visualized as consisting of a number of layers of water. The top layer intercepts the metal stream, forming relatively large particles, and these particles are then atomized into smaller particles by layers of water under the top layer. This process of larger particles being broken into smaller ones continues until the metal droplets are cooled below the melting point or leave the water spray streams in a soft condition, the latter when it is desired to form round or spherical particles. In this manner, successive break-down of larger particles is done in adjacent sprays as well as in the spray that commenced the atomization, and the particles are contained in water or other liquid during the process.

Employing the new apparatus, the product has a very low surface oxide content. Should it be desired to reduce the surface oxidation further, a suitable inert atmosphere may be provided around the metal stream and in the receiver 1.

Water is the most practical medium for use in atomizing molten metal, but other suitable inert normally liquid materials, e.g., higher hydrocarbons, may be used. The temperature of the water supplied to the pump 11 is not critical and can vary widely, it generally ranging from the temperature of tap water to about 120° F. The temperature of the water should be such as to extract the necessary quantity of heat with the volume of water delivered to the molten metal. The body of water 2 in the receiver 1 ordinarily need not be cooled, and its temperature will generally vary from 100° F. to 140° F., where the tank is initially filled and subsequently replenished with tap water. The receiver 1 is not under pressure, and a vapor vent 16 is provided to reduce any tendency towards pressure build-up at the metal stream entrance, which would tend to interfere with the flow of the metal stream 9 and lower the efficiency of atomization.

The invention is applicable to a variety of metals and alloys, as described above, with the melting temperature of the metal varying accordingly. The metal may be poured at rates up to and exceeding 6 tons per hour, in a stream having a diameter up to and exceeding one-half inch. The molten metal stream is preferably cylindrical, for optimum control of particle shape and size, but it may have a cross-section other than circular, such as elliptical, square, hexagonal and other configurations.

The velocity of the disintegrating liquid streams may range from about 50 to 1000 feet per second. At least three liquid nozzles are employed, and up to 24 nozzles may be required for control over particle size and shape with increasing metal pouring rates. Thus, for example, 3 to 6 equally spaced nozzles may be employed for pouring rates up to about 2700 pounds per hour. From about 3000 to 12,000 pounds per hour, 8 nozzles may be employed, and over 12,000 pounds per hour, from 12 to 24 nozzles may be required. Of course, a larger number of nozzles could be employed in each instance.

With increasing water pressure and consequently increasing water velocity, the particle size becomes smaller and recovery efficiency increases. By "recovery efficiency" is meant the quantity of the desired particle size produced relative to the quantity of metal atomized. The volume of water required may range from $\frac{1}{10}$ of a gallon per pound of metal for the lower melting point metals and alloys to 50 gallons per pound of metal for the high melting point metals and alloys.

The nozzle mounts 10a are mounted centrally of the annular base 17 of the manifold 10, which has a rectangular cross-section. As previously described, the nozzles 14 are mounted for movement in any direction, in three dimensions, and for rotation about their axes. In the preferred form of the invention, the nozzles are constructed to produce flat spray streams. This is achieved by means of an oval nozzle opening, as illustrated in Figures 8–11. In practice, the nozzle of Figures 8 and 9 produces a spray which diverges from a completely flat spray by approximately 10–15°, i.e., about 5–8° away from the axial plane on each side thereof, the divergence being a little greater in the center of the spray than at the ends. The spray is thus slightly oval in cross-section and not perfectly flat. While flat sprays are preferred as giving the optimum control of particle shape and size, they can take other shapes such as oval or round. However, with round (symmetrical) liquid streams, the control becomes more complicated and more streams are required.

Figure 3:
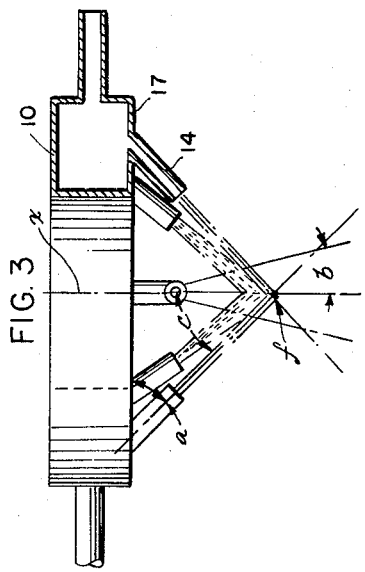
Figure 3 is a schematic sectional elevational view of the manifold and nozzles, taken on line 3—3 of Figure 2.
Figure 11:
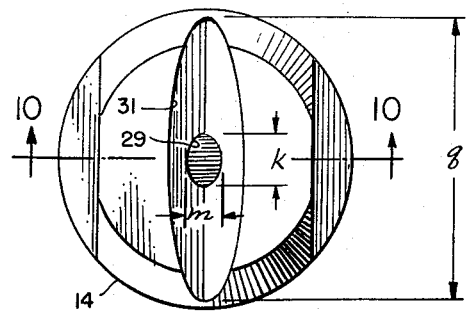
Figure 11 is a top plan view of the nozzle of Figure 10.
Figure 10:
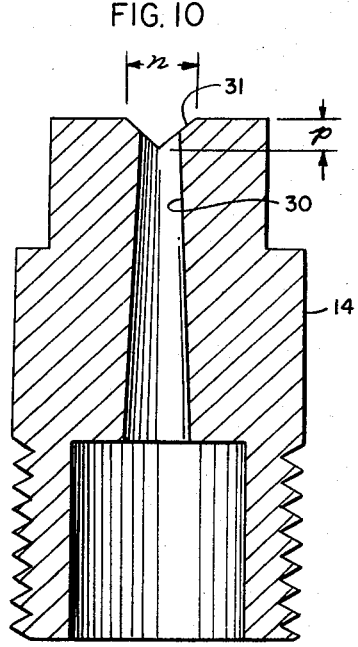
Figure 10 is a longitudinal sectional view of another preferred nozzle, taken on line 10—10 of Figure 11.

The flat streams of the embodiment of Figures 10 and 11 also diverge about 15° on each side of the axial plane normal to the flat surface, corresponding to the angle $b$ illustrated in Figure 3. In order to avoid loss of control due to this divergence and to minimize energy loss, the nozzles are arranged so that their openings are within about 4 to 7 inches from the axis $x$ of the molten metal stream, as represented by $e$ in Figure 5.

Figure 4:
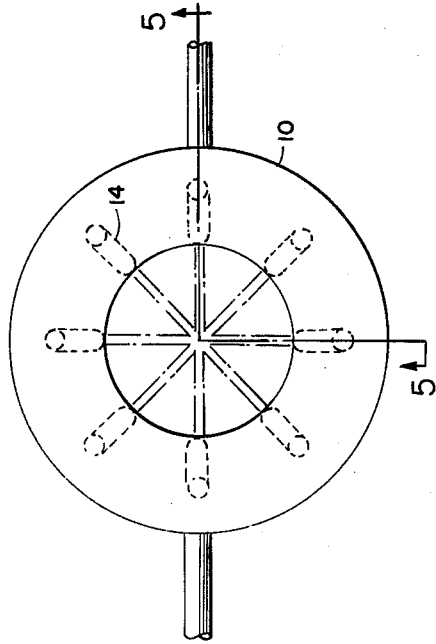
Figure 4 is a view like Figure 2, illustrating another preferred arrangement of the nozzles.
Figure 5:
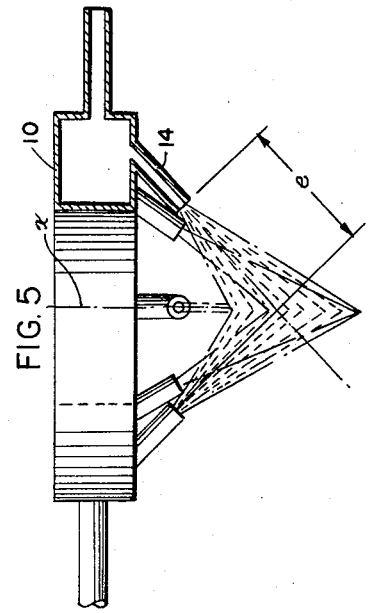
Figure 5 is a view like Figure 3 taken on lines 5—5 of Figure 4.
Figure 2:
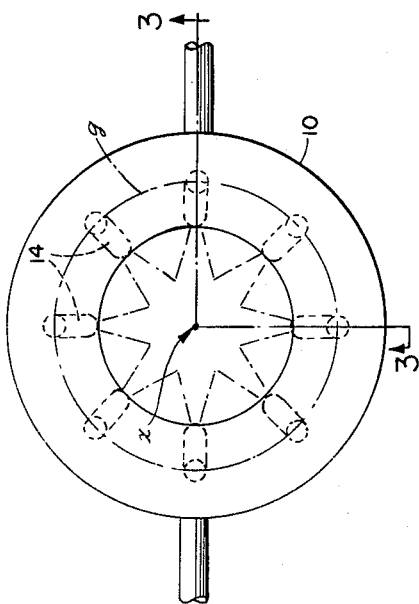
Figure 2 is a schematic plan view of a liquid manifold or header and liquid nozzles connected thereto, as employed in the construction of Figure 1 and illustrating one preferred arrangement of the nozzles.

In the embodiment illustrated in Figures 2 and 3, the liquid nozzles 14 are arranged so that their longitudinal axes intersect the metal stream axis at a focal point $f$, and so that the flat surfaces of the liquid streams are at an angle of 90° to the metal stream axis. In Figures 4 and 5, the flat surfaces are at an angle of 0° to the metal stream axis. This reference to the angle between the flat water streams and the metal stream axis means that when the flat stream axial plane coincides with or is parallel to the metal stream axis, the angle is 0°; when the flat stream is rotated 90° about its longitudinal axis, so as to be perpendicular to the metal stream axis, in projection, the angle is 90°.

It has been found that when the angle of the plane of the flat stream to the metal stream is 90°, the comminuted particles tend to be round or spherical. When the angle is 0°, the particles tend to be irregularly shaped. Thus, by rotating the nozzles, the shape of the particles can be varied as desired.

It has also been found that the angle of intersection between each liquid stream and the metal stream, or the angle between the respective axes when they intersect, indicated as $c$ in Figure 3, may be an acute angle varying from about 20° to 60°, the opposite angle $a$, between the nozzle axis and the horizontal correspondingly varying from 70° to 30°. Preferably, the angle of intersection $c$ is about 40° to 50° for optimum control of particle shape and size. It has been found that when the angle of intersection $c$ is about 50° or greater, the tendency is towards round particles, with control of the particle size decreasing. When the intersectional angle $c$ is about 40° and below, the tendency is to produce irregular particles having more uniform particle size.

The illustrations show the liquid stream axes intersecting at one focal point $f$ on the axis $x$ of the metal stream, and this is generally preferred for best control. However, the liquid stream axes may be shifted by an angle of divergence $d$, illustrated in Figure 7, to develop a particular liquid pattern for a metal. Where the angle $d$ is 0°, and the streams intersect at one point $f$, the combined water force and flow is downward in a column. By adjusting the sprays to an offset position as indicated in Figure 7, and by suitable adjustment of the angle of intersection $c$, a downwardly spiralling flow may be developed. Thus, the method and apparatus provide for interception or noninterception of the water sprays, as required to furnish the desired control of the metal particle characteristics.

When reference is made to adjustment of the directions of the liquid streams with respect to the metal stream, either or both of the foregoing adjustments is contemplated, of the angle of intersection $c$, or the opposite angle $a$, and of the angle of divergence $d$. Adjustment of unsymmetrical liquid streams by rotation about their axes contemplates adjustment of the above-described angle between the flat (unsymmetrical) water streams and the metal stream axis.

The particles formed by the liquid spray streams are cooled by the liquid. In producing irregular particles, it is preferred to cool the particles below the melting point of the metal, retaining the particles in the water sprays until they become solidified. When producing round particles, it is preferable to cool the particles to the point where they are slightly soft when they leave the sprays, so that the desired spherical shape is formed as the particles fall into the body of water 2 in the receiver 1.

The apparatus may be constructed with a number of different nozzle constructions. Figures 8–11 illustrate two preferred nozzle constructions. The nozzle 14 of Figure 10 was employed in the atomization runs or tests reported herein, and the nozzle 14' of Figure 8 can be used interchangeably. The nozzle 14 or 14' is connected to the nozzle mount 10a by a nozzle adapter 17 having a socket 18 formed by the adapter body 19 and a retaining member 20. The nozzle adapter 17 is also provided with a ball 21, forming a ball and socket joint with the socket 18. The joint is secured by a clamp 22, engaging channeled shoulders 23 on the adapter. The direction of the axis of the nozzle 14 or 14' can thus be adjusted in three dimensions. Also, the nozzle can be rotated about its axis thereby.

The nozzle 14' also includes a central tube 24 threaded into the ball 21 at one end. A nozzle head 25 is mounted on the opposite end, being secured and fixed in position by a clamp 26 threadedly engaging the central tube. The nozzle head has an oval bore 27, as shown in Figure 9, and it may also be rotated by loosening the clamp 26 and turning the nozzle head. The nozzle 14' was identified as ¼ TT 1510 (Spraying Systems Inc., Bellwood, Ill.), and the dimensions of the bore were $h=.093$ inch, and $j=.072$ inch. The width or diameter $i$ of the semi-cylindrical transverse groove 28 of the nozzle head was 0.078 inch.

The nozzle 14 illustrated in Figures 10 and 11 is threadable into the ball 21 in Figure 8. The embodiment illustrated is identified as ¼ U 1510 Veejet, has an oval bore 30 terminating in a mouth 29 having the dimensions $k=.093$ inch, and $m=.078$ inch. The nozzle end has a V-groove 31 in the direction of the long axis of the mouth, having the dimensions $n=.171$ inch, $p=.093$ inch, and $q=.531$ inch.

Nozzles can be used having larger and smaller apertures than those illustrated. The nozzle openings and stream shapes can be varied. Likewise, other changes in construction can be made within the scope of the invention.

As described above and exemplified, the arrangement of the liquid nozzles 14 can take the form of an equilateral triangle, a square, a hexagon, an octagon, and so on. Superposed banks of nozzles may be employed, so that a preliminary group of liquid sprays intercepts the molten metal stream to commence breaking it up before entering the main liquid streams. However, very good results are obtained by employing a single group of liquid nozzles and liquid streams according to the invention.

The invention was successfully applied to a representative variety of metals and alloys, under various conditions. The following table is given by way of example and illustrates the atomization of molten metals poured in a cylindrical stream, employing the preferred apparatus and method described and illustrated. In each case, 8 liquid nozzles 14 of the type illustrated in Figure 10 and producing a flat spray, were used. They were mounted on the manifold 10 in the manner illustrated, so that the diameter of the circle $g$ (Figure 2) passing through the bases of the nozzles was 8 inches. The distance $e$ from the mouth of each nozzle to the axis $x$ of the metal stream was, respectively, 5 inches and 6 inches, for the water nozzle angles $a$ with the horizontal of 40° and 50°, corresponding to angles of intersection $c$ of 50° and 40°. In each operation, each of the nozzles was focused on a single focal point $f$ on the metal stream axis, and the angle of the flat spray stream with the metal stream was 75°. The temperature of the water spray was about 60° F., and the temperature of the water bath 2 was about 120° F.

*Table*

CHEMICAL ANALYSIS

| | AISI 316 | AISI 304 | AISI 46125 | Ni | 14% Si-Fe | Hi Temp. Alloy | | Brazing Alloy |
|---|---|---|---|---|---|---|---|---|
| | | | | | | No. 1 | No. 2 | |
| | Percent | Percent | Percent | Percent | Percent | Percent | Percent | Percent |
| C | 0.08 | 0.07 | 1.27 | 0.01 | 0.04 | 0.09 | 0.25 | 0.15 |
| Si | 2.35 | 2.41 | 0.32 | 0.92 | 14.05 | 0.53 | 0.35 | 10.00 |
| Mn | 0.92 | 0.99 | 0.90 | 0.85 | 0.26 | 0.57 | 0.20 | 0.99 |
| Cr | 18.32 | 18.18 | | | | 18.45 | 24.56 | 18.75 |
| Ni | 11.16 | 10.41 | 1.93 | 98.00 | | 51.39 | | 68.55 |
| Co | | | | | | 19.15 | 57.87 | |
| W | | | | | | | 14.86 | |
| Mo | 2.34 | | 0.23 | | | 3.77 | | |
| Fe | Bal. | Bal. | Bal. | | Bal. | 0.47 | 1.01 | 0.86 |
| Al | | | | | | 2.80 | | 0.05 |
| Ti | | | | | | 2.71 | | 0.11 |
| B | | | | | | | 0.36 | |

CONDITIONS OF ATOMIZATION

| Grade | Metal Temp., °F. | Pour Rate, lbs./hr. | Metal Stream Diameter in. | Water Pressure, p.s.i.g. |
|---|---|---|---|---|
| AISI 316 | 2,750 | 2,900 | ¼ | 1,200 |
| AISI 304 | 2,750 | 1,500 | ¼ | 1,000 |
| AISI 46125 | 2,770 | 1,200 | ¼ | 600 |
| Nickel | 2,775 | 3,300 | ¼ | 1,000 |
| 14% Si-Fe | 2,900 | 6,000 | ⅜ | 1,000 |
| Hi Temp. Alloy No. 1 | | 4,100 | ⅜ | 1,000 |
| Hi Temp. Alloy No. 2 | | 4,200 | ⅜ | 1,000 |
| Brazing Alloy | 2,710 | 4,300 | ⅜ | 1,000 |

| Grade | Water Velocity, ft./sec. | Water Volume, g.p.m. | Water nozzle Angle with Horizontal Degrees ($a$)[1] | Particle Shape |
|---|---|---|---|---|
| AISI 316 | 370 | 44 | 40 | Irregular. |
| AISI 304 | 336 | 40 | 40 | Do. |
| AISI 46125 | 255 | 30.4 | 40 | Spherical. |
| Nickel | 336 | 40 | 40 | Irregular and Spherical. |
| 14% Si-Fe | 336 | 40 | 50 | Do. |
| Hi Temp. Alloy No. 1 | 336 | 40 | 50 | Irregular. |
| Hi Temp. Alloy No. 2 | 336 | 40 | 50 | Do. |
| Brazing Alloy | 336 | 40 | 50 | Spherical. |

[1] Angle $c$ equals 90°−$a$.

SIEVE ANALYSIS—U.S. STANDARD MESH

| | +20 Mesh | −20+50 Mesh | −50+100 Mesh | −100 Mesh |
|---|---|---|---|---|
| | Percent | Percent | Percent | Percent |
| AISI 316 | 5.8 | 7.2 | 12.0 | 68.0 |
| AISI 304 | 7.0 | 5.5 | 8.3 | 74.0 |
| AISI 46125 | | 21.0 | 27.0 | 41.0 |
| Nickel | | 29.2 | 15.0 | 52.0 |
| 14% Si-Fe | 20.0 | 16.0 | 12.4 | 45.0 |
| Hi Temp. Alloy No. 1 | | 27.2 | 19.3 | 53.5 |
| Hi Temp. Alloy No. 2 | | 41.9 | 13.5 | 44.6 |
| Brazing Alloy | | 12.3 | 14.1 | 73.6 |

From the table, it will be seen, for example, that the brazing alloy was atomized approximately as illustrated in Figures 2 and 3 (i.e., at 75° instead of 90° as illustrated) at a nozzle angle $a$ with the horizontal of 50°. The particles produced contained a high proportion of particles passing through a 100-mesh screen, 73.6%, and they were round and free flowing.

AISI 316 stainless steel powder was atomized with water at 1200 p.s.i.g., producing a water velocity of 370 ft. per sec., approximately in the manner illustrated in Figures 2 and 3, at a nozzle angle $a$ of 40°. This operation produced 68% of powder passing through a 100-mesh screen and the particles were irregular. The particle shape and size distribution were suitable for molding structural parts.

In a further run, not included in the table, a heat of AISI 316 stainless steel was atomized with the object of obtaining greater irregularity. By increasing the nozzle angle $a$ wtih the horizontal to 45°, and adjusting the angle of the flat spray stream with the metal stream to 0° to 20°, a powder was obtained which was more irregular in shape than any ever produced previously. The metal was poured through a ¼ inch diameter nozzle, at a temperature of 2800° F., a pour rate of 2100 lbs./hr., and using water at 1000 p.s.i.g. through the same nozzle arrangement and focused on a point $f$ on the metal stream axis.

As described above, the water velocity may vary over a wide range, about 50 to 1000 ft. per sec. The range is preferably about 75 to 850 ft. per sec., corresponding to water pressures of about 50 to 6000 p.s.i.g. for the system exemplified, and especially advantageous results are obtained in the water velocity range of about 150 to 400 ft. per sec.

As another example according to the invention, it was found that three equidistant spray nozzles directed to a focal point on the metal stream axis, at an angle $a$ of 35–40° below the horizontal, produced coarse spherical particles of AISI 440–A stainless steel at water pressures of 150 to 600 p.s.i.g. The metal was poured through a ¼" diameter cylindrical nozzle at 3000 pounds per hour. The angle of the flat spray streams to the metal stream was 80°. At greater pressures and corresponding water velocities, some of the particles assumed an irregular potato shape. Increasing the angle of the nozzle to 50° below the horizontal, or decreasing the angle of intersection $c$, accentuated the formation of the potato shape.

As a further example, the atomization of AISI 304 stainless steel was conducted with water pressures ranging from 200 to 1400 p.s.i.g. As the pressure and water velocity increased, the particle size became finer and recovery efficiency (recovery of particles below 100-mesh) increased. With the flat spray streams arranged at 0° to the metal stream, coinciding with its axis, the particles tended to be irregular in shape. When the flat spray streams were 90° to the metal stream, the particles tended to be spherical and quite regular in shape, and adjustments between 0 and 90° gave intermediate results.

When the nozzle angle $a$ with the horizontal was 40° and the angle of intersection $c$ was 50°, the particles tended to be spherical and control over particle size decreased. These effects increased as the angle $a$ became smaller and the angle $c$ became correspondingly greater. Nozzle angles $a$ with the horizontal of 50° and greater, or angles of intersection $c$ of 40° and less, produced more irregular particle shapes and more uniform particle size.

It will be understood that the foregoing examples are given for purposes of illustration, and the invention is not limited thereto, nor to the materials, conditions and procedures thereof. Likewise, the apparatus may be constructed and arranged in various ways within the spirit and scope of the invention.

There is thus provided by the invention a new and improved apparatus for atomizing molten metal and producing finely comminuted metal particles or powder. The invention is applicable to numerous metals and alloys, and it is especially advantageous in altering the tendency of certain metals to take preferred particle shapes during atomization. The versatile nature of the invention provides high production rates and high atomization efficiency, while providing excellent regulation of the particle shape. Control of particle shape is achieved without sacrifice in particle size distribution. The invention is adaptable to quantities ranging from small experimental runs of special compositions to production runs of standard powders involving pouring and atomizing rates of more than six tons per hour.

The invention is hereby claimed as follows:

1. Apparatus for atomizing molten metal comprising means for forming a stream of molten metal, at least three liquid nozzles adapted to form unsymmetrical liquid spray streams and surrounding said metal stream and adapted to form a cone of liquid streams intersecting at the apex, said cone enclosing said metal stream and said metal stream intersecting the cone, means for changing the axial directions of said nozzles and thereby changing the included angle at the apex of said cone and the angle of intersection of said metal stream, and means for changing the rotation of said nozzles about their axes.

2. Apparatus for atomizing molten metal comprising means for forming a stream of molten metal, at least three liquid nozzles adapted to form unsymmetrical liquid spray streams and surrounding said metal stream and adapted to form a cone of liquid streams intersecting at the apex, said cone enclosing said metal stream and said metal stream intersecting the cone, means for changing the axial directions of said nozzles and thereby changing the included angle at the apex of said cone and the angle of intersection of said metal stream, adapted for changing said metal stream angle of intersection in the range of 20° to 60°, means for changing the angles of divergence between the axes of said nozzles and the axis of said metal stream, and means for changing the rotation of said nozzles about their axes.

3. Apparatus for atomizing molten metal comprising means for forming a stream of molten metal, at least three liquid nozzles adapted to form flat liquid spray streams and surrounding said metal stream and adapted to form a cone of liquid streams intersecting at the apex, said cone enclosing said metal stream and said metal stream intersecting the cone, means for changing the axial directions of said nozzles and thereby changing the included angle at the apex of said cone and the angle of intersection of said metal stream, and means for changing the rotation of said nozzles about their axes.

4. In combination with a tank adapted to receive molten metal being poured from a container above said tank, apparatus for atomizing said molten metal comprising a pouring nozzle on said container forming a stream of molten metal therefrom, an annular liquid manifold in said tank and surrounding said metal stream, at least three liquid nozzles mounted on said manifold equiangularly therearound for intersection of the several liquid streams therefrom with said metal stream and with each other, whereby said metal stream is enclosed in a cone of intersecting liquid streams, said nozzles being adapted to form unsymmetrical liquid spray streams, pivot means connecting said nozzles to said manifold for changing the angles of intersection between the axes of said nozzles and the axis of said metal stream in the range of 20° to 60°, and means for changing the rotation of said nozzles about their axes.

5. The apparatus defined in claim 4 wherein said liquid nozzles are adapted to form flat liquid spray streams.

References Cited in the file of this patent

UNITED STATES PATENTS

| | | |
|---|---|---|
| 777,388 | McDowell | Dec. 13, 1904 |
| 982,964 | Jantzen | Jan. 31, 1911 |
| 1,404,142 | Riedell | Jan. 17, 1922 |
| 2,159,433 | Ervin | May 23, 1939 |
| 2,245,549 | Allen | June 10, 1941 |
| 2,470,569 | Meighan et al. | May 17, 1949 |
| 2,636,219 | Beamer et al. | Apr. 28, 1953 |
| 2,810,157 | Slayter et al. | Oct. 22, 1957 |

FOREIGN PATENTS

| | | |
|---|---|---|
| 181,610 | Australia | Apr. 12, 1955 |
| 461,125 | Canada | Nov. 15, 1949 |

UNITED STATES PATENT OFFICE
CERTIFICATION OF CORRECTION

Patent No. 2,956,304                          October 18, 1960

William L. Batten et al.

It is hereby certified that error appears in the above numbered patent requiring correction and that the said Letters Patent should read as corrected below.

Column 6, line 22, for "channeled" read -- channular --; column 10, line 36, list of references cited, under the heading "FOREIGN PATENTS", for "Australia" read -- Austria --.

Signed and sealed this 6th day of June 1961.

SEAL)
Attest:

ERNEST W. SWIDER                          DAVID L. LADD
Attesting Officer                             Commissioner of Patents